United States Patent [19]

Jacek et al.

[11] 4,220,360

[45] Sep. 2, 1980

[54] HOSE COUPLING

[76] Inventors: Edwin S. Jacek; Janet B. Jacek, both of 3306 NE. 15th St., Fort Lauderdale, Fla.

[21] Appl. No.: 25,349

[22] Filed: Mar. 30, 1979

[51] Int. Cl.² .................. F16L 21/00; F16L 37/12
[52] U.S. Cl. ............................... 285/317; 285/417; 285/DIG. 22
[58] Field of Search ............ 285/320, 317, 319, 417, 285/369, DIG. 22

[56] References Cited

U.S. PATENT DOCUMENTS

| 593,190 | 11/1897 | Bernhardt | 285/317 |
|---|---|---|---|
| 593,191 | 11/1897 | Bernhardt | 285/317 X |
| 623,416 | 4/1899 | McCrory | 285/320 X |
| 747,360 | 12/1903 | Barry | 285/319 X |
| 747,412 | 12/1903 | Getz | 285/317 X |
| 2,702,202 | 2/1955 | Kaiser | 285/317 X |
| 2,903,763 | 9/1959 | Grenell | 285/417 X |

FOREIGN PATENT DOCUMENTS 570671  7/1945  United Kingdom .................... 285/417

Primary Examiner—Thomas F. Callaghan
Attorney, Agent, or Firm—Frank P. Cyr

[57] ABSTRACT

A hose coupling comprising a coupling body and coupling means secured to the ends of a hose. A circumferential groove formed in the coupling means cooperate with depressible spring pressed latches pivotally mounted on the coupling body. A hook portion is provided on the said latches to engage with the said groove to retain the parts of the coupling in assembled relationship. To disassemble the coupled parts, the spring pressed latches are depressed thereby lifting the hook from the groove thus enabling the coupled parts to be disconnected from one another.

2 Claims, 4 Drawing Figures

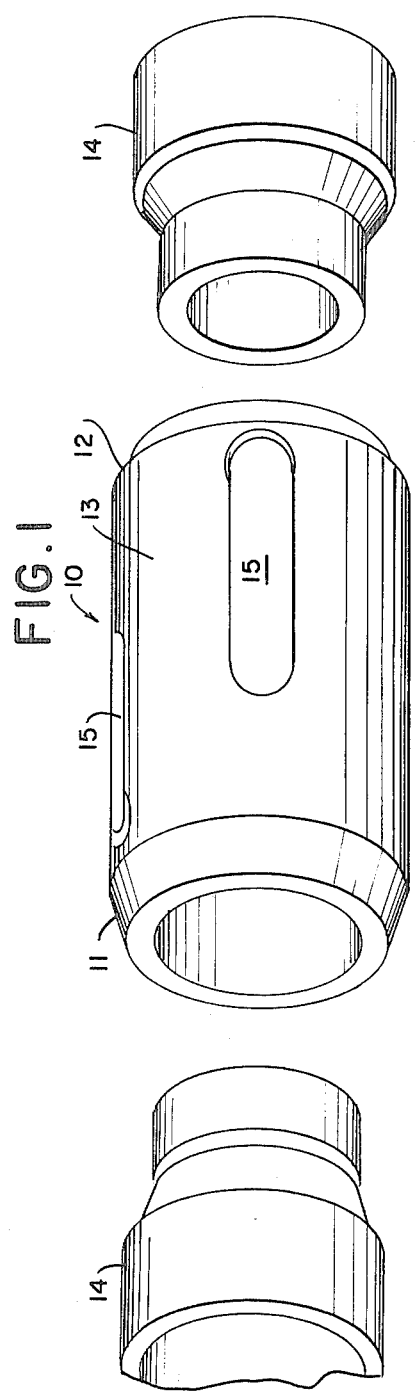
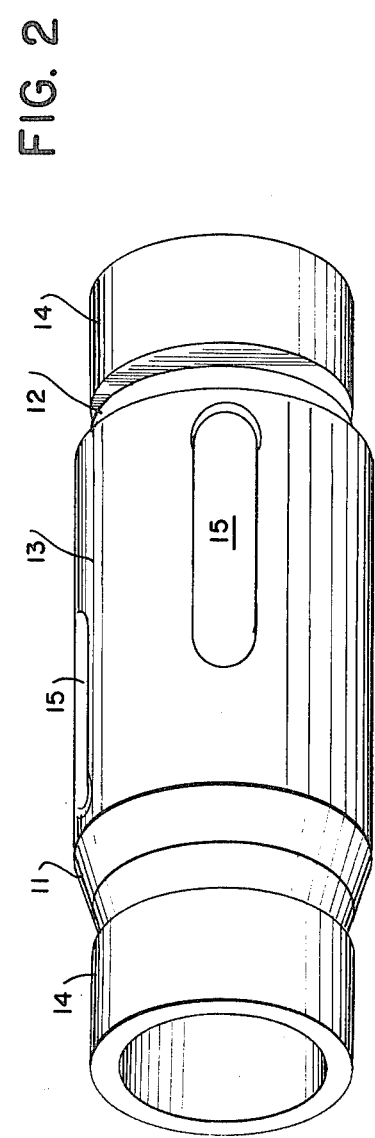

HOSE COUPLING

BACKGROUND OF THE INVENTION

Throughout the ensuing description of the coupling which is to be described in detail hereinafter, reference will be made to the adaptability of the improved coupling particularly to connect fire hose sections together although it must be understood the coupling may be equally and as effectively employed in connecting sections of garden hoses, hydraulic of pneumatic lines of the like.

In prior art couplings it was necessary that the person effecting the coupling of the hose sections determine if the end of the hose to be coupled was of the male or female configuration. Obviously, this could be time consuming and this becomes particularly important when it is desired to connect sections of fire hoses at the site of the fire. Also, as is often experienced by one pulling the connected hose sections over a curb, around a corner, or through a door or window opening, some portion of the coupling which extends beyond the outer periphery of the coupling will hang up on the aforesaid obstructions and it then becomes necessary that the hung portion of the coupling be lifted over such obstructions in order to permit for the continued travel of the hose when the same is being pulled from one area to another.

Thus, with the above in mind, it is the primary object of the invention to design a coupling which will be devoid of any projections extending beyond the outer periphery of the coupling and also to construct a coupling which will be capable of coupling hose sections together without first having to determine which end of the hose is to be presented to the unitary body of the coupling to be coupled thereto.

Also, another object of the invention is to provide a coupling for hose sections whereby the coupling of the hose sections to the unitary body structure can be effected by merely pushing the coupling sections together whereby when the coupling elements are forced into engagement with one another there will be a snap fit of the coupling members thus doing away with the threading of the coupling members in order to secure the coupling members to one another.

Another object of the invention is to provide two pairs of diametrically opposed spring latches which, when depressed, will cause a disengagement of the hose sections from the unitary body when a pulling force is applied to the said hose sections.

With the foregoing and other objects in mind, the invention will be more fully described hereinafter and will be more particularly pointed out in the claims appended hereto.

DESCRIPTION OF THE DRAWINGS

FIG. 1 is a side elevation with parts broken away showing the portion of the coupling which is secured to one end of a hose disconnected from the central unitary coupling body.

FIG. 2 is a side elevation showing the coupling in assembled relationship.

Figure 3:
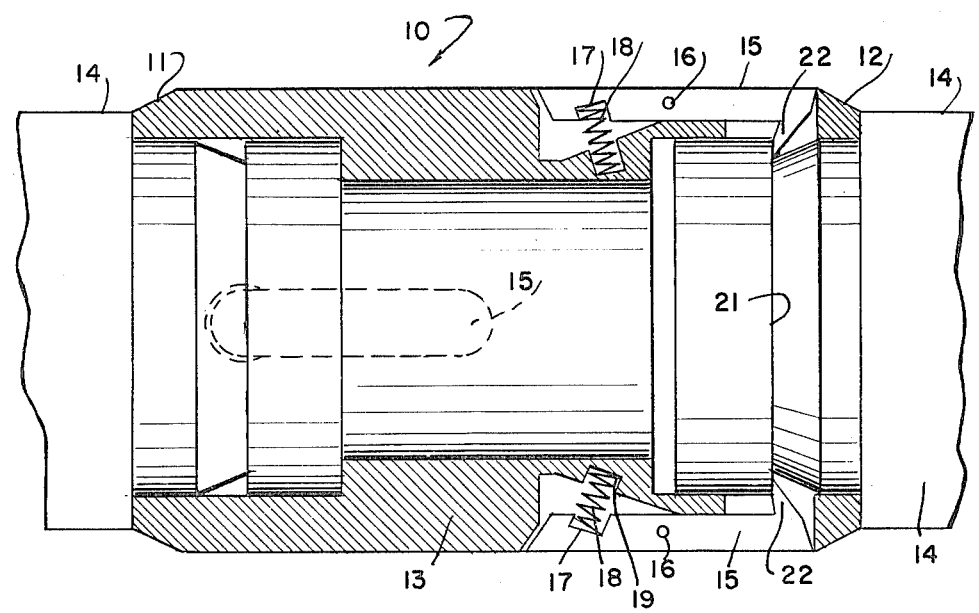
FIG. 3 is a side elevation showing the connecting latches in engagement with the grooves formed in the portion of the coupling which is secured to one end of a hose, and, FIG. 4 is a side elevation showing the connecting latches disconnected from the groove formed in the portion of the coupling which is secured to a hose.

Before undertaking a detailed description of the subject invention it must be pointed out that the manner of securing hose sections in the manner to be described more fully hereinafter is adapted to be used more particularly for connecting fire hose sections together. As is well know, fire hose is usually carried in sections on a fire truck and when the truck carrying the hose sections reaches the scene of a fire, the hose sections must be joined together with care taken that the proper end of the hose is brought to the coupling. In other words, if the coupling is so formed that the end of the hose to be connected thereto requires that a male coupling be brought thereagainst for coupling therewith then the end of the hose section having the male connector secured thereto must be brought to the coupling for connection therewith. As can be appreciated, if the wrong end of the hose, that is, the end of the hose having a female connector secured thereto is brought to the coupling, the connection between the parts cannot be effected. The present disclosure will define a structure which will obviate the need to select the end of the hose to be brought to the coupling means.

Referring now to the drawings wherein like reference numerals are employed to designate like parts throughout the several views thereof, 10 designates in general a unitary coupling body formed of any suitable material such as steel, brass, plastic or the like. The coupling is cylindrical in outer configuration. As can be seen from the drawings, the ends 11 and 12 of the coupling body 13 are bevelled so as to enable the coupling body and hose sections connected thereto to be pulled over curbs, door or window openings and the like without having some portion of the coupling hanging up on obstructions presented by such obstacles.

Detachably secured to both ends of the coupling body 13 are coupling means 14 to which are secured the end of a hose (not shown).

A pair of diametrically opposed depressible spring latches 15 are pivotally mounted as at 16 to the body 13 of the coupling. A cavity 17 is formed in the body 13 and a spring 18 is positioned in an opening 19 formed in the said cavity. The spring 18 urges the latch 15 upwardly so that when the coupling sections are secured to one another in a manner to be described more fully hereinafter the latch will lie in a plane paralled to the plane of the surface of the coupling body 13. While we have shown in detail the arrangement of the latches 15 mounted at one end of the coupling body 13, it will be understood that a like pair of diametrically opposed spring latches are provided at the opposite end of the coupling body 13 and the same are designed to operate in the same manner in coupling the parts of the coupling together.

Formed adjacent one end of the aforesaid coupling means 14 is a circumferential groove 20 having an upstanding wall or edge 21. Hook portions 22 are provided at one end of the said latches and the hook portions are adapted to cooperate with said groove to retain the parts of the coupling in coupled relationship. It will be noted that the front wall of the hook portions 22 are bevelled rearwardly as shown in the drawings so that when the hose sections which are secured to the coupling means 14 are to be coupled to the coupling body 13, a mere pushing force applied to the coupling means 14 will cause the bevelled portion of the hook 22 to ride over the body of the coupling means 14 and to snap in place in the aforesaid groove 20 and to engage with the upstanding wall of edge 21 to retain the coupling parts in coupled relationship.

Figure 4:
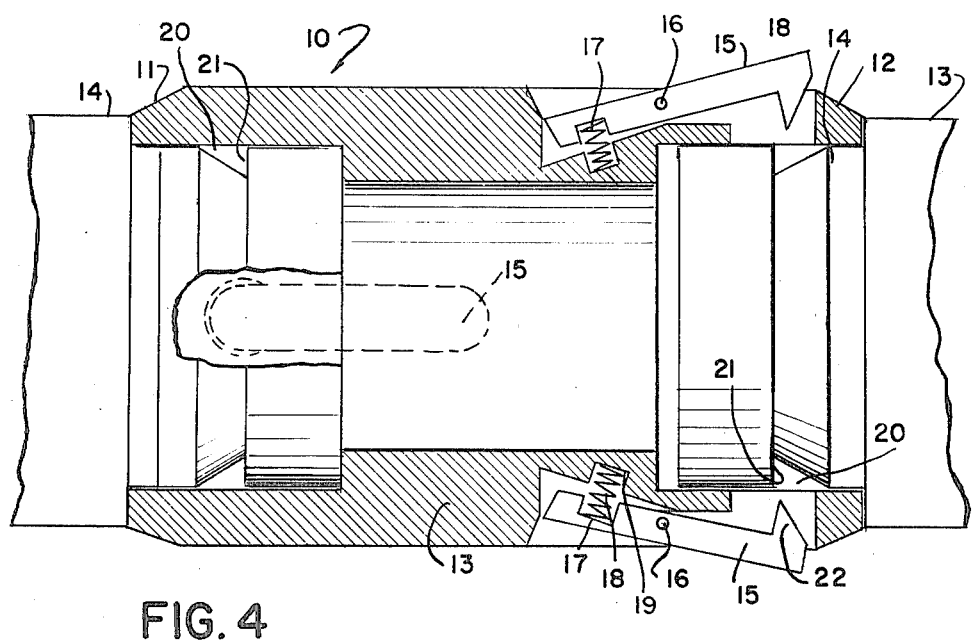

To disconnect the coupling members one need only apply a downward force on the spring end of the said latches such as shown in FIG. 4 of the drawings. This will cause the hook portion of the latch to disengage with the aforesaid groove and by pulling the coupling means apart the coupling of the parts can be disengaged.

The coupling means 14 may be made from any material such as steel, brass, plastic or the like and the hose sections may be secured thereto in any known manner.

Thus far we have described the working parts of the coupling shown in the drawings. Since the coupling means 14 to which the end of the hose section is secured thereto are identical in construction, either end of a hose section having the coupling means secured thereto will engage with the coupling body 13 in the manner aforesaid, and it is not necessary for one to determine which end of the hose section is to be presented to the coupling body 13 before coupling the same since either end of the hose sections will be received by and coupled to the coupling body 13.

As can be appreciated, we have devised a coupling for hose sections which will eliminate the necessity of determining which end of the hose is to be presented to the coupling body in order to effect a coupling of the parts together.

It is obvious that various changes and modifications may be made in the detailed construction and design of the above specifically described embodiment of the invention without departing from the spirit thereof, such changes and modifications being restricted only by the scope of the following claims.

What is claimed is:

1. A hose coupling comprising a central unitary coupling body open at each end thereof and having a central external cylindrical surface portion, a pair of like coupling means, each adapted to be secured to a hose and cooperable with each end of the coupling body, an annual groove formed in each coupling means, a pair of diametrically opposed latches pivotally mounted on said central coupling body at each end thereof, a hook portion formed on each of said latches, spring means mounted in said unitary central coupling body urging each of said latches into engagement with a said annular groove when said coupling means is pushed inwardly into an open end formed in said central coupling body, said latch means lying within recesses in said central coupling body and having an external surface commensurate with the external surface of the central coupling body and lying thereon so that no portion thereof extends beyond the central coupling body surface when said central coupling body is in latched engagement with its cooperating coupling means, the opposite ends of the said central coupling body being frustoconical with the outer diameter of the apex equal to the outer diameter of the coupling means and the outer diameter of the base equal to the outer diameter of the central cylindrical portion of the coupling body whereby smooth and unobstructed conical transitional surfaces are provided for the coupling to prevent its impalement when in use on obstructions such as curbs, doors, or the like.

2. A hose coupling as in claim 1 wherein one end of the said recessed latch has a beveled end cooperable with the said coupling means and the other end of said latch is operative to pivot said latch out of engagement with its associated coupling means.

* * * * *